(12) United States Patent  (10) Patent No.: US 9,094,773 B2
Wyler  (45) Date of Patent: Jul. 28, 2015

(54) SYSTEM AND METHOD FOR ENABLING WIRELESS CONNECTIVITY OF A DEVICE

(75) Inventor: Gregory Thane Wyler, Sewalls Point, FL (US)

(73) Assignee: Worldvu Satellites Limited (GB)

( * ) Notice: Subject to any disclaimer, the term of this patent is extended or adjusted under 35 U.S.C. 154(b) by 198 days.

(21) Appl. No.: 13/339,534

(22) Filed: Dec. 29, 2011

(65) Prior Publication Data

US 2013/0170392 A1   Jul. 4, 2013

(51) Int. Cl.
*H04W 4/00* (2009.01)
(52) U.S. Cl.
CPC ............ *H04W 4/001* (2013.01); *H04W 4/008* (2013.01)
(58) Field of Classification Search
None
See application file for complete search history.

(56) References Cited

U.S. PATENT DOCUMENTS

| | | | |
|---|---|---|---|
| 7,657,255 B2 * | 2/2010 | Abel et al. | 455/414.1 |
| 2012/0042363 A1 * | 2/2012 | Moosavi et al. | 726/5 |

* cited by examiner

*Primary Examiner* — Kouroush Mohebbi
(74) *Attorney, Agent, or Firm* — Kaplan Breyer Schwarz & Ottesen, LLP

(57) ABSTRACT

A system and method for enabling communication between a first communication apparatus and a second communication apparatus are disclosed, wherein the method may include reading identification information from a data medium associated with the first communication apparatus with a data medium reader incorporated within a personal communication device; uploading the first-communication-apparatus identification information from the portable communication device to a computer system over the internet; storing the first-communication-apparatus identification information in a database accessible by the computer system; and configuring authentication data for the second communication apparatus to recognize the first communication apparatus, using the first-communication-apparatus identification information.

14 Claims, 3 Drawing Sheets

BACK END SYSTEM
300

SYSTEM AND METHOD FOR ENABLING WIRELESS CONNECTIVITY OF A DEVICE

BACKGROUND OF THE INVENTION

Configuring wireless devices for connection to the interne is a cumbersome task. Regardless which wireless protocol is used, substantial setup activity is required. This initial configuration process is one of the leading causes of technical support calls for consumer products. A common setup process includes learning a predetermined password and user name, navigating to a particular screen using a menu system that is generally built into the device being configured, and entering a secondary password. In some cases, for instance in devices without screens, there is first a requirement to load configuration software into a computer, then attach the computer to the device and configure the device from the computer. For inexperienced users, this setup procedure can be burdensome, and the value of the setup has to overcome the investment in time to set it up. Accordingly, there is a need in the art for improved systems and methods for configuring and connecting products having wireless communication links to the Internet or to other broadband systems.

SUMMARY OF THE INVENTION

According to one aspect, the present invention is directed to method for enabling communication between a first communication apparatus and a second communication apparatus, wherein the method may include reading identification information from a data medium associated with the first communication apparatus with a data medium reader incorporated within a personal communication device; uploading the first-communication-apparatus identification information from the portable communication device to a computer system over the internet; storing the first-communication-apparatus identification information in a database accessible by the computer system; and configuring authentication data for the second communication apparatus to recognize the first communication apparatus, using the first-communication-apparatus identification information.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Figure 1:
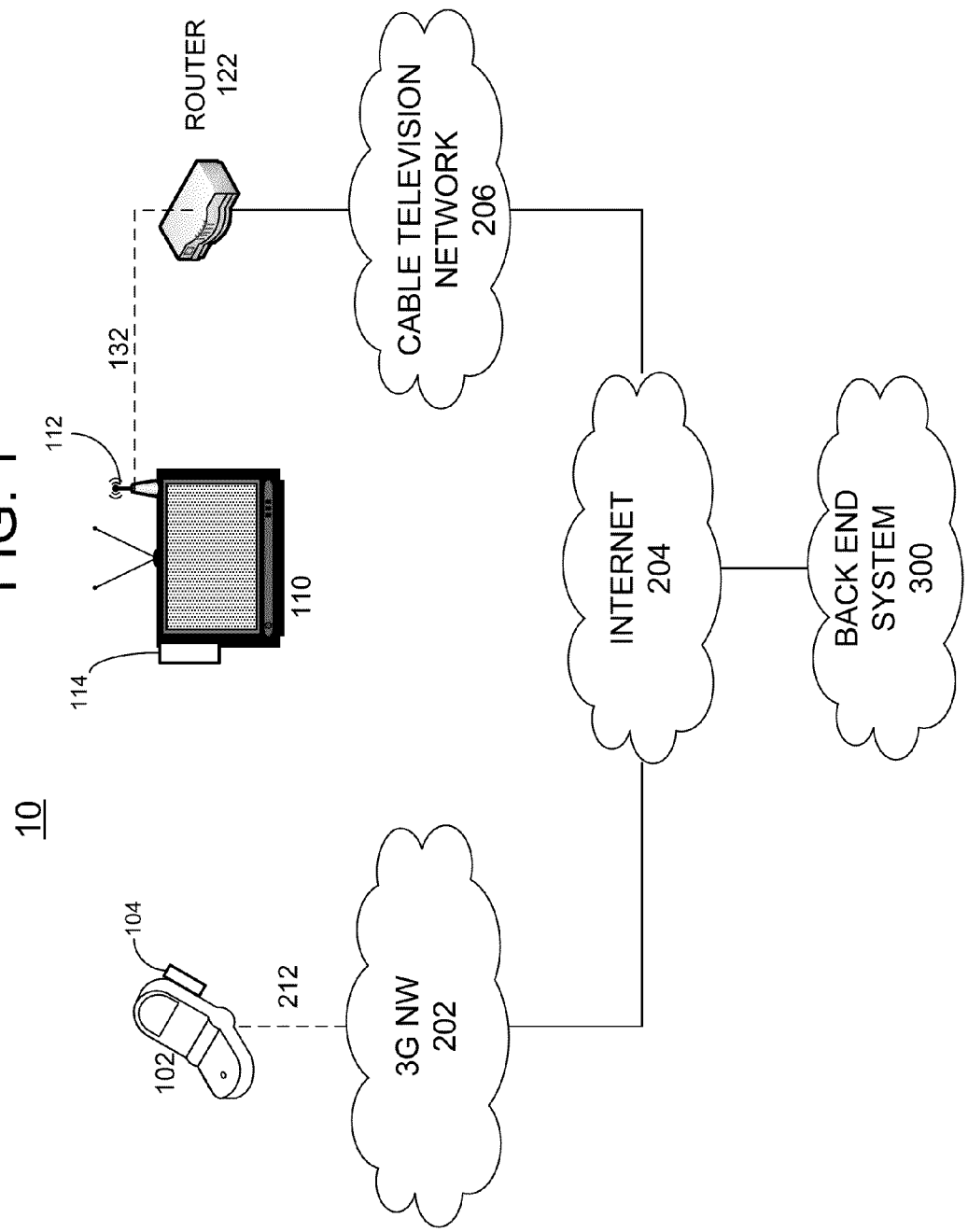
FIG. 1 is block diagram of a system for enabling a portable communication device to employ a broadband connection to enable connectivity of a first device to a second device via a wireless link, in accordance with an embodiment of the present invention.

FIG. 1 is block diagram of a system 10 for enabling a portable communication device 102 to employ a broadband network 202 to enable connectivity of a first device 110 to a second device 122 via a wireless link 132, in accordance with an embodiment of the present invention. Otherwise stated, portable communication device 102, which may be a cell phone, may provide an out-of-band communication means for providing a setup procedure for in-band communication connection 132. In the embodiment of FIG. 1, in-band communication connection 132 is a WIFI connection. However, the invention is not limited to enabling WIFI connections.

The embodiment of FIG. 1 may be operable to enable a combination of the NFC tag 114, NFC reader 104 and the internet 204 connectivity of both cell phone 102 and router 122 to bypass the usual setup procedure for television set 110 (also referred to as device 110 herein) to enable WIFI communication 132 between television set 110 and router 122. Thus, the indirect internet connection between cell phone 102 and router 122 may serve as a means of communication between television set 110 and router 122 that is parallel to the direct WIFI connection between devices 110 and 122. One possible benefit of this parallel communication path is to enable the setup of television set 110 (or other WIFI-enabled device) with router 122 using a more efficient and user-friendly setup method which may be made available using back end system 300. Thus, in addition to providing an alternate path by which television set 110 may be set up to communicate with router 122, an embodiment of the present invention preferably enables the entry and processing of setup data to move from television set 110 to back end system 300, thereby enabling access to a more user-friendly interface, more powerful processing equipment, and/or more extensive data storage resources than are available on television set 110, or other WIFI enabled device for which a setup procedure is contemplated.

While the embodiments discussed herein contemplate the use of a near-field communication (NFC) tag and NFC reader as mechanism for enabling cell phone 102 to obtain user name and password information from device 110, the present invention is not limited to this particular device identification technology. More generally, any data medium and corresponding reader of the data medium may be employed. Specifically, a data medium 114 of any suitable type could be disposed on or near (or merely be accurately associated with) device 110, and a reader 104 compatible with the data medium 114 and capable of reading the data medium may be enabled to read data medium 114 and to communicate with cell phone (or other portable communication device) 102. The data medium/data-medium reader technologies may include but are not limited to: radio-frequency identification (RFID) tags and corresponding readers, whether active or passive RFID tags; magnetic tape as the data medium and a suitable magnetic reading head as the corresponding reader; a bar code and corresponding bar code reader, among other possible data storage and data reading technologies.

While the disclosure herein is directed primarily to enabling the setup of a WIFI-enabled device with a router 122, the invention is not limited to this embodiment. In other embodiments, the principles of the present invention may be applied to enabling setup and/or communication between devices with communication means other than local WIFI connectivity, such as wired connections and/or wireless links using technology other than broadband or local WIFI connections.

System 10 may include 3G network 202, cable television network 206, Internet 204 (which may alternatively be considered to include 3G network 202 and/or cable television network 206), and/or back end system 300. System 10 may further include television set 110 which may include wireless (WIFI) modem 112, and/or near-field communications (NFC) and tag 114; router 122; and/or portable communication device 102 (which in the embodiment of FIG. 1 is a cell phone) which may be in communication with NFC reader 104. In this embodiment, NFC reader 104 may be incorporated within cell phone 102. Alternatively, NFC reader may be affixed to an exterior surface of cell phone 102. Router 122 may communicate with television set 110 WIFI modem 112 via wireless communication connection 132. 3G network 202 may communicate with cell phone 102 via wireless communication connection 212.

The embodiment of FIG. 1 shows NFC tag 114 and NFC reader 104 (collectively the NFC devices) affixed to device 110 and cell phone 102, respectively. However, attachment of the NFC devices in the manner shown in FIG. 1 is not required to practice the invention. So long as NFC tag 114 is associated with, and correctly identifies, device 110 (which is a television set in the embodiment of FIG. 1), NFC tag 144 need not necessarily be affixed to an exterior surface of device 110 as shown in FIG. 1. Instead NFC tag could be located sufficiently close to television 110 that the user knows to associate tag 114 with device 110. NFC tag need not be in any particular location so long as it remains unambiguously associated with a particular device.

Similarly, NFC reader 104 need not necessarily be incorporated within, or attached to an outside surface of, cell phone 102. In other embodiments, NFC reader 104 could be a portable independent device and be brought into communication with cell phone 102, when needed. The connection of a portable, independent version of NFC reader 104 could be enabled to communicate with cell phone 102 either wirelessly or using a wired connection.

The principles of the present invention are not limited to devices for which the out-of-band setup communication employs NFC technology. Other out-of-band communication technologies may be employed including, but not limited to, other radio-frequency communication protocols such as Bluetooth, or other Radio Frequency Identification (RFID) techniques, and optical technologies including bar codes and associated bar code readers.

In the case of bar code identification, the product, such as television set 110, could have a bar code disposed on a surface thereof, or merely be located conveniently to the television set 110 and be associated with television set 110. Continuing with this alternative embodiment, a bar code reader compatible with the bar code associated with television set 110 may be incorporated within a portable communication device such as a cell phone, Smartphone, laptop computer, tablet computer, or other portable communication device. In this manner, bar code reading may be used as the out-of-band communication mechanism for setup and configuration in place of, or in addition to, the user of near-field communications technology discussed herein.

We note that still other alternative out-of-band setup/configuration communication mechanisms may be employed. For instance, the product, such as television set 110, may be enabled to transmit a user name and/or password using an existing communication port, thereby obviating a need to incorporate an additional communication mechanism that is used only for setup and configuration purposes.

For instance, a setup button could be pressed on the product which would cause the product to emit a predetermined data stream, that includes user name and password data, from one or communication ports. The portable communications device could be configured to expect and receive the setup-mode communication data stream. The pertinent data stream could be transmitted out of one or more of the following types of data port: (a) a USB port; (b) an light emitting diode; (c) an infra-red light output port; (d) a radio-frequency antenna; (e) a WIFI port; (f) a sonic output port; and a (g) an ultrasonic output port. However, the present invention is not limited to the use of the above-listed technologies.

Television set 110 may be in communication with WIFI modem 112 and/or NFC tag 114. Television 110 may further have NFC tag 114 and/or WIFI modem 112 incorporated therein. FIG. 1 shows television set 110 as the device to be configured for communication with router 122. However, other devices may be enabled for communication in the manner described herein for television set 110. Such other devices may include, but are not limited to, one or more of the following: a printer, a radio, communication devices such as another cell phone, a laptop computer, a tablet computer (such as but not limited to the I-pad®), a home theatre system, a computer monitor; and/or any computer peripheral device.

In the embodiment of FIG. 1, router 122 may be a general purpose wireless router having a wired connection to the Internet 204, either directly, or via cable television network 206. Router 122 preferably provides high-bandwidth wireless connectivity within a relatively small range, such as within 50 feet, within 100 feet, within 200 feet, or other relatively limited area. This type of local wireless communication is commonly referred to as WIFI connectivity.

Figure 2:
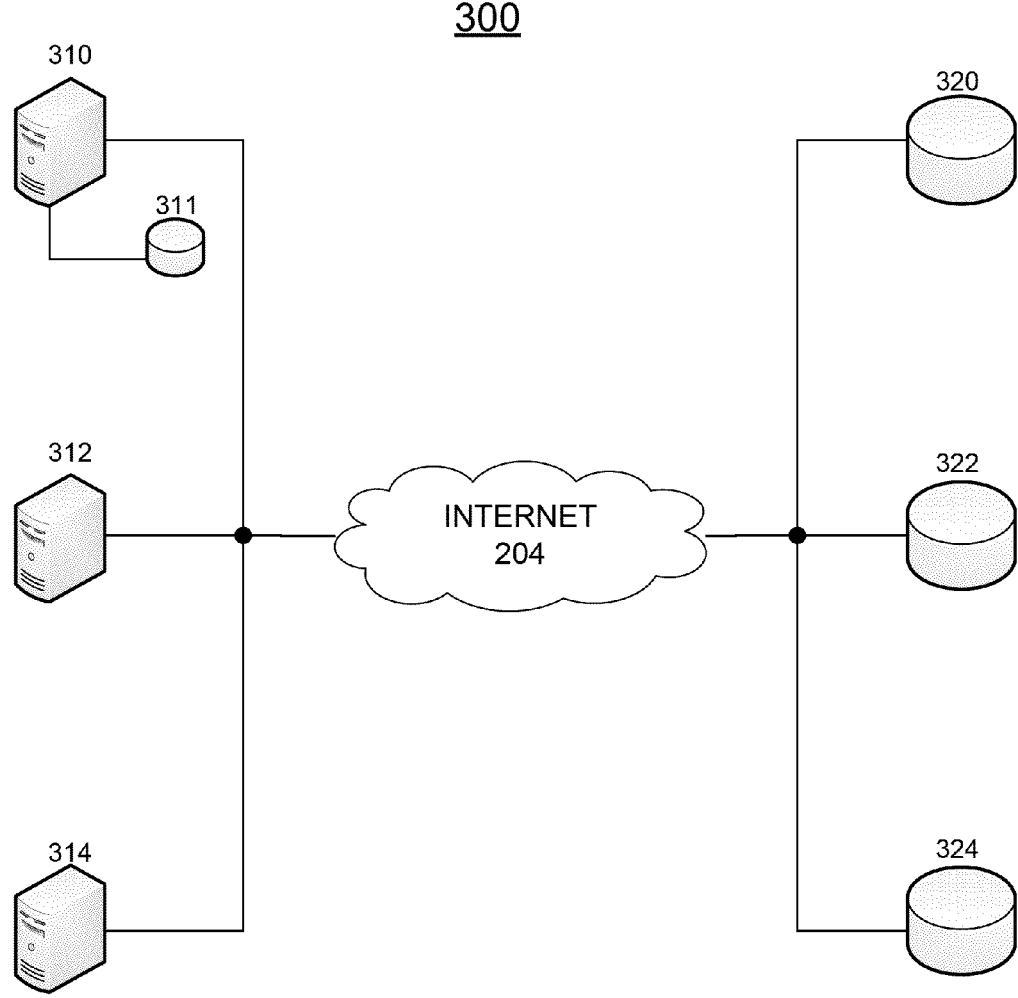
FIG. 2 is a block diagram of an embodiment of the back end system shown in FIG. 1.

FIG. 2 is a block diagram of an embodiment of the back end system shown in FIG. 1. An embodiment of back end system 300 may be operable to provide setup and configuration services that may replace the setup and configuration activity that in existing systems would be conducted using television set 110 (or other WIFI-enabled device) itself. However, back end system 300 preferably provides considerably greater computing power and greater data storage resources than that available on even a large number of consumer WIFI enabled devices. Moreover, the configuration and setup data, once entered onto back end system 300 may be accessible to one or more authorized parties other than the user of television set 110. Further the pertinent setup data may be adjusted as needed to reflect changes in data communication standards, changes in equipment (such as a change in router 122), and/or changes in the amount and type of media services available to be transmitted to television set 110 by virtue of contractual or other changes occurring between the user of television set 110 and the proprietors of data to be delivered to television set 110 via router 122. As stated earlier, television set 110 is but one example of WIFI-enabled consumer devices whose connectivity to a local routing device may be enabled by embodiments of the present invention.

Back end system 300 may include computer systems 310, 312, and 314; and/or data storage facilities 320, 322, and 324.

Computer system 310 is shown including a local data storage device 311, which may also be referred to as database 311. However, any of the computer systems shown in FIG. 2 may also include local data storage. While three computer systems and three data storage facilities are shown in FIG. 2, it will be appreciated that fewer or more than three computing systems, and fewer or more than three data storage facilities may be configured for use with back end system 300. The equipment of back end system 300 may be concentrated at one location. However, alternatively, the various operational components of back end system 300 may be distributed over the internet 204 and may communicate with one another over the "cloud" as needed. Moreover, the functionality of back end system 300 need not be permanently assigned to any fixed set of hardware devices. Instead, the functionality and/or data storage of back end system 300 may be migrated to computing systems on a for-hire basis, as needed.

Having described the devices and interconnections shown in FIGS. 1 and 2, we now direct attention to the operation of the equipment discussed above. A person using the embodiment of FIG. 1, preferably has a cell phone 102, which may be a smart-phone with internet 204 connectivity, which has an NFC reader 104 incorporated therein. The user may utilize an application on their cell phone 102 which is designed to access the back end system 300 via the internet 204. Back end system 300 may also be enabled to communicate with the router 122 to receive and transmit data for registration, authentication, and/or configuration of WWI-enabled devices, such as television set 110. Back end system 300 may host a web site accessible by portable device 102 for the purpose of submitting user name and password data for device 110.

Upon first obtaining the television set 110, the user may run an application on cell phone 102 to cause NFC reader 104 to read NFC tag 114. This may be accomplished by bringing NFC reader 104 to within two centimeters (cm) of NFC tag 114. However, changing technology in the NFC field may enable NFC tag 114 to be read from distances greater than two centimeters in the future.

Preferably, the tag-reading application running on cell phone 102 loads pertinent data about television set 110 from NFC tag 114 into memory cell phone 102. The user may then instruct cell phone 102, using a suitable sequence of keys, or verbal commands, to transmit the stored data about device 110 to back end system 300 using wireless link 212 and internet 204. Alternatively, the cell phone 102 could communicate the information to back end system 300 immediately upon reading the data from NFC tag 114. Once the data about device 110 has been uploaded to the web site (which may be hosted on one of the computing systems forming part of back end system 300 shown in FIG. 2), device 110 may be listed on the web site as a device associated with the user and with cell phone 102.

Back end system 300 may then determine configuration settings for use in router 122 to enable router 122 to accept the password and registration identifier (and, optionally any other information deemed helpful to ensuring proper device identification and authorization) of device 110 and/or other devices which may communicate with router 122. Once the router 122 configuration settings have been determined by back end system 300, the configuration settings may be transmitted from back end system 300 via the internet 204, and, if needed, through another intermediary network such as cable television network 206, to router 122. Router 122 may store the data locally. Alternatively, device configuration and registration data could be stored exclusively on back end system 300. In this latter case, during a post-setup device 110 login procedure, router 122 would consult back end system 300 to compare the login information for device 110 and grant communication access to device 110 only if the login information provided by device 110 matches the data stored on back end system 300 accessed by router 122.

In this embodiment, when television set 110 may be preprogrammed to attempt to log in to router 122 each time television set 110 is turned on. Television set 110 may also be preprogrammed to attempt, in the case of using WIFI communications, to log in to router 122 by cycling through each available WIFI router, in the event multiple WIFI routers are indicated to television set 110 as being available for use by the WIFI SSID codes of the respective WIFI routers.

In response to the above-described attempts by television set 110 to login to router 122, router 122 may check a database in back end system 300 to determine whether television set 110 is authorized to use router 122. Prior to cell phone 102 uploading identification information for television set 110 to database 311 within back end system 300, router 122 may fail to find suitable authentication information for television set 110. However, after cell phone 102 has uploaded identification information for television set 110 to database 311, a subsequent powering on of television set 110 and associated login attempt by television set 110 to router 122 will again cause router 122 to query database 311 in relation to the identification and authentication of television set 110. Preferably, in this case, router 122 will find suitable identification and authorization information for television set 110 in database 311 and thus allow television set 110 to login to router 122, thereby enabling communication link 132 to be set up.

In sum then, the above describes a process and communication path parallel to wireless communication link 132 and the standard device-to-router connection procedure for setting up device 110 for communication with router 122. In one embodiment, this parallel path may entail a path including the following sequence of participants: (a) cell phone 102, 3G network 202, internet 204, and back end system 300 where registration and password information, along with additional information if needed, is generated. Thereafter, the registration and password information generated by back end system 300 may be transmitted to internet 204, then to cable television network 206 (or other intermediary network suitable for the purpose for which router 122 is being used, such as for instance an internet service provider), and thereafter to router 122. Thereafter, router 122 may communicate along WIFI connection 132 with the WIFI antenna 112 on or within device 110.

In one embodiment, device 110 may be configured to accept passwords present within an authentication list stored within back end system 300. Therefore, each device, such as device 110, which connects to the WIFI router 122, could be set up to have a different password. In other embodiments, the local gateway could be something other than WIFI router 122, such as television cable box, or special-purpose network communication gateway.

In another embodiment, router 122 may reconfigure itself to match the user name, password, and/or SSID (Service Set Identifier) (if needed) of device 110, and send a new configuration code to device 110, to ensure that device 110 will interact effectively with other devices coupled to router 122.

Login Procedure for Registered Devices

Having described setup operations in accordance with embodiments of the present invention, we now address an embodiment of a method for a device 110 logging into router 122, once setup is complete. When a device 110 is powered on, and a communication session is sought by device 110, a login process for conducting communication with the internet 204 via router 122 is needed to ensure that only authorized devices are able to communicate using router 122.

Upon initially requesting a communication session with each available WIFI router, if more than one is present, device 110 preferably supplies a password, and possibly additional identifying information to router 122. To determine whether device 110 is authorized to use the communication facilities that router 122 connects to, router 122 then preferably compares the password received from device 110 to a list of passwords currently recognized as authorized. The pertinent list of passwords may be stored locally, either within router 122 or in a memory device proximate to, and accessible by router 122. However, in another embodiment, router 122 may initiate contact with a suitable device within back end system 300 to determine whether device 110 is authorized to use router 122 for communication.

Back end system 300 may store an extensive amount of information listing all the devices authorized to use services associated with back end system 300 and optionally which services each device is entitled to use. In this manner back end system 300 may provide a single convenient data service which can add, remove, and/or edit lists of devices that are recognized as authorized to use services that are registered with back end system 300. Back end system 300 can store and act upon additional layers of detail such as services that each device is authorized to access. Back end system may operate to restrict the number of services that are accessible by a particular device, based on one or more factors such as, but not limited to: (a) the particular device seeking communication services; (b) the identity of the person using the device for which access is sought; (c) the location in which the device is located (some media services are available in some areas, but not others, such as for instance sporting events that are "blacked out" in areas offering the service on special pay-tv services); and/or (d) the total bandwidth consumed by the device and/or by the person using the device within a specified preceding time period. The present invention is not limited to using the above-listed criteria as bases for restricting and/or enabling access to specific communication services and/or specific media content.

Wireless Protected Setup

We note that the above may differ from the situation that results when using WPS (Wireless Protected Setup)—a method in which two buttons are pressed. One difference between WPS and the approach disclosed herein is that the method disclosed herein can work with any device, and is not limited to working with devices that have WPS technology support. Another difference is that WPS only works in networks in which all devices support WPS and are configured to utilize WPS. In contrast, the method disclosed herein may work with any variety of connection methodologies and devices. Another difference between WPS and the approach disclosed herein that the approach disclosed herein allows the user to list/configure his/her device(s) remotely, thereby enabling the user to have significantly more control over the data concerning configuration, registration, and authentication of the one or more devices in his possession. This additional control may include the ability to remotely disconnect or change one or more users of the devices, and to implement variations in the media-access authorizations granted to respective devices, including granting access to different combinations of media resources to different users and/or to different devices. For example, certain users may be granted access to certain IP address ranges and other users may be granted other types of access.

Once television set 110 is in communication with the Internet 204, or other broadband communications network, such as a Cable television network 206, control software that is preferably implemented within back end system 300 will preferably create a new random username and password for the television set and transmit the new password to the television, and/or lock the access to the interne specifically to the MAC address of the television set. In some instances, the television set 110 may periodically check a special web site, associated with the service provider for television set 110, to receive any further, or updated, configuration instructions.

The web site database may include lists of all the devices associated with a particular person, with a particular residence, and/or with a particular IP address. Moreover, since configuration data for many devices will preferably be stored in locations accessible to back end system 300, various other types of database analyses will be available. For instance, once configuration data for various devices are uploaded, back end system 300 will preferably be able to glean data from its archives such as: (a) the number of subscribers in a particular neighborhood; (b) the number of televisions sets of various brands that use particular media services; (c) correlations of demographic data with selected media services etc.

The above has been described in terms of enabling devices to communicate with WIFI routers, such as router 122. However, in alternative embodiments, communication connections between devices employing other protocols, such as Zigbee, Bluetooth, Insteon, or ANT+ could be enabled. The present invention is not limited to any particular wireless communication protocol. The principles for enabling connectivity between two devices disclosed herein may be applicable to a host of communication protocols other than standard WIFI protocol, including wired connections, and over time, to communication protocols developed in the future.

Benefits of Embodiments Disclosed Herein:

One embodiment here contemplates the use of an NFC strip on a device with an out-of-band reader (that is, a reader using a communication method and apparatus other than the one the device uses for its primary function) to transmit configuration information for the device to a location remote from the device, to manage the configuration of the in-band communication.

Various embodiments above involve the use of an NFC strip 114 and corresponding NFC reader 104. However, as an alternative to the NFC strip, we could use any out-of-band communication between the device 110 (which may be a television set) and a cell phone 102 (or other portable Internet-enabled communication device) in order to transmit configuration information to a computer, in any desired location, that will manage the configuration of the in-band communication (where in-band communication refers to communication between the device 110 and the local communication gateway, which may be router 122). In the embodiment of FIG. 1, the in-band communication mechanism between device 110 and router 122 is WIFI communication. However, the present invention is not limited to enabling WIFI communication. Indeed, the principles of the present invention may be applied to enabling any communication type between device 110 and router 122.

Figure 3:
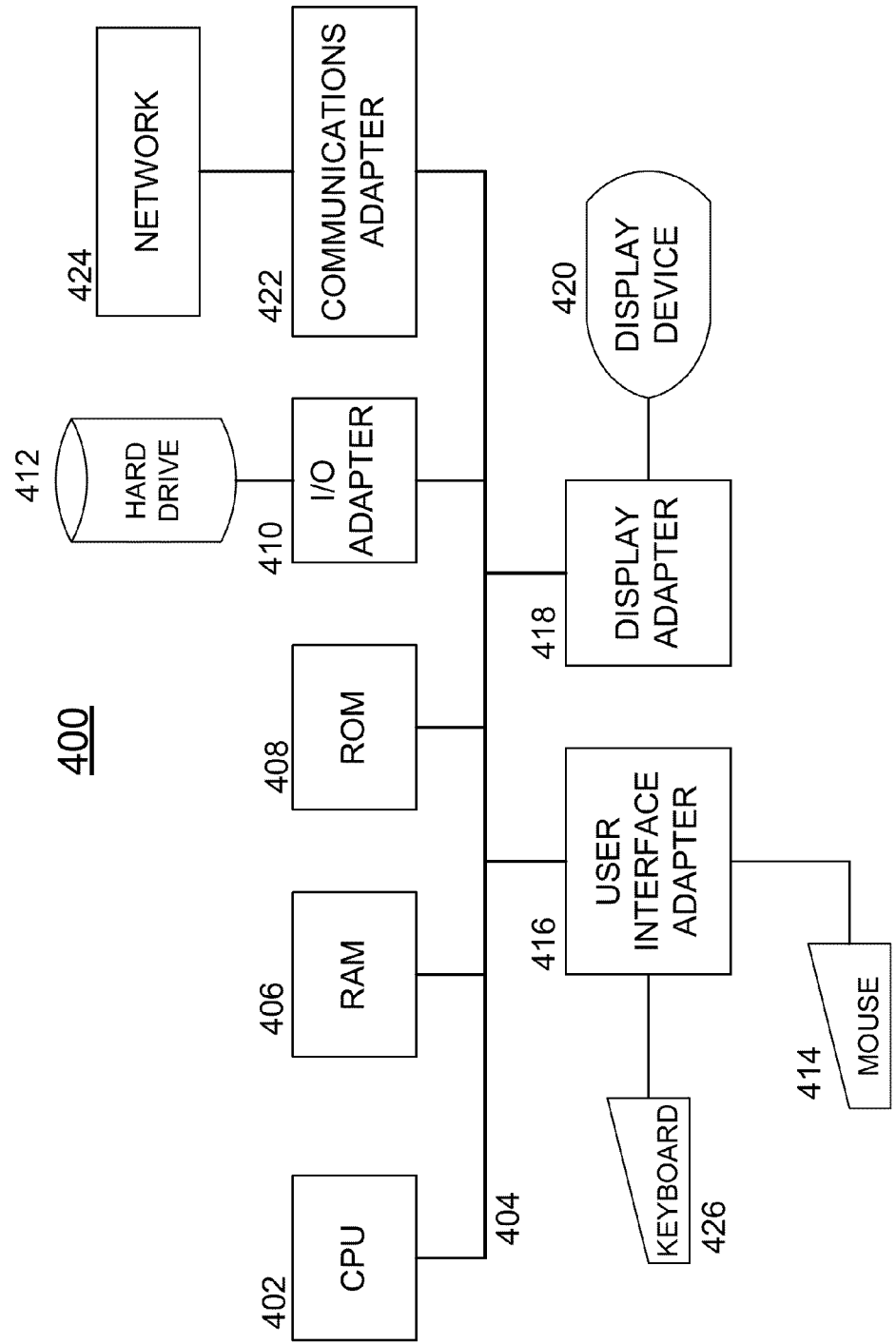
FIG. 3 is a block diagram of a computing system that may be used in conjunction with one or more of the computing devices employed within the system of FIG. 1 or 2, in accordance with an embodiment of the present invention.

FIG. 3 is a block diagram of a computing system 400 adaptable for use with one or more embodiments of the present invention. Central processing unit (CPU) 402 may be coupled to bus 404. In addition, bus 404 may be coupled to random access memory (RAM) 406, read only memory (ROM) 408, input/output (I/O) adapter 410, communications adapter 422, user interface adapter 406, and display adapter 418.

In an embodiment, RAM 406 and/or ROM 408 may hold user data, system data, and/or programs I/O adapter 410 may connect storage devices, such as hard drive 412, a CD-ROM (not shown), or other mass storage device to computing system 400. Communications adapter 422 may couple computing system 400 to a local, wide-area, or global network 424. User interface adapter 416 may couple user input devices, such as keyboard 426, scanner 428 and/or pointing device 414, to computing system 400. Moreover, display adapter 418 may be driven by CPU 402 to control the display on display device 420. CPU 402 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for enabling an in-band communication between an unauthenticated communication device and a local gateway device that provides access to a public network by using an out-of-band communication path between the unauthenticated communication device and a portable communication device, the method comprising:
   reading information identifying the unauthenticated communication device from the unauthenticated communication device through the out-of-band communication path using a data reader of the portable communication device, the unauthenticated communication device being located downstream of the local gateway device;
   uploading, without using the out-of-band communication path to the unauthenticated communication device, the read identification information from the portable communication device to a computer system located upstream of the local gateway device and connected to the public network;
   storing the uploaded identification information in a location accessible by the computer system;
   transmitting, by the computer system, authentication data associated with the stored identification information over the public network to the local gateway device so as to enable, through the in-band communication path, a communications link between the unauthenticated communication device and the local gateway device using the transmitted authentication data to establish a wireless connection between the unauthenticated communication device and the local gateway device.

2. The method of claim 1, further comprising obtaining the authentication data based on the stored identification information so as to allow the local gateway device to recognize the unauthenticated communication device through the in-band communication path.

3. The method of claim 1, further comprising storing the authentication data for the unauthenticated communication device in a database for access by the local gateway device.

4. The method of claim 3, further comprising:
   the database receiving a query from the local gateway device regarding an authentication of the unauthenticated communication device; and
   allowing the local gateway device to request access to the authentication data stored in the database for purposes of authenticating the unauthenticated communication device through the in-band communication path.

5. The method of claim 1, wherein the step of transmitting authentication data includes transmitting authentication data for establishing a WIFI connection between the unauthenticated communication device and the local gateway device.

6. The method of claim 1, wherein:
   the step of reading information includes reading a user name and password associated with the unauthenticated communication device; and
   the step of transmitting authentication data includes transmitting the read user name and password as part of the authentication data to the local gateway device for use by the local gateway to establish the communications link.

7. The method of claim 1, wherein the step of reading information includes reading the information contained in an NFC tag.

8. A system for enabling an in-band communication between an unauthenticated communication device and a local gateway device that provides access to a public network by using an out-of-band communication path between the unauthenticated communication device and a portable communication device, the system comprising:
   an application program adapted to be executed in a portable communication device to read identification information from the unauthenticated communication device through the out-of-band communication path and to upload, without using the out-of-band communication path to the unauthenticated communication device, the read identification information through the public network, the unauthenticated communication device being located downstream of the local gateway device; and
   a back end system including at least one computer system located upstream of the local gateway device and connected to the public network, the computer system operable to receive and store the uploaded identification information in a storage, and to transmit authentication data associated with the stored identification information to the local gateway device over the public network so as to allow the local gateway device to enable, through the in-band communication path, a communications link between the unauthenticated communication device and the local gateway device to establish a wireless connection between the unauthenticated communication device and the local gateway device.

9. The system of claim 8, wherein the computer system is operable to obtain the authentication data based on the stored identification information so as to allow the local gateway device to recognize the unauthenticated communication device through the in-band communication path.

10. The system of claim 8, wherein the computer system stores the authentication data for the unauthenticated communication device in a database for access by the local gateway device for purposes of authenticating the unauthenticated communication device through the in-band communication path.

11. The system of claim 10, wherein the database is operable to receive a query from the local gateway device regarding an authentication of the unauthenticated communication device, and allow the local gateway device to request access to the authentication data stored in the database in response to the received query for purposes of authenticating the unauthenticated communication device through the in-band communication path.

12. The system of claim 8, wherein the computer system transmits the authentication data to the local gateway device for establishing a WIFI connection between the unauthenticated communication device and the local gateway device.

13. The system of claim 8, wherein:
the application program being executed in the portable communication device is operable to read a user name and password associated with the unauthenticated communication device; and
the computer system transmits the read user name and password as part of the authentication data to the local gateway device for use by the local gateway to establish the communications link.

14. The system of claim 8, wherein the application program being executed in the portable communication device is operable to read information contained in an NFC tag.

\* \* \* \* \*